US011473006B2

United States Patent
Vo et al.

(10) Patent No.: US 11,473,006 B2
(45) Date of Patent: Oct. 18, 2022

(54) EXCAPSULATION OXIDIZING BREAKERS FOR DOWNHOLE APPLICATIONS

(71) Applicant: Halliburton Energy Services, Inc., Houston, TX (US)

(72) Inventors: Loan K. Vo, Houston, TX (US); Dipti Singh, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 4 days.

(21) Appl. No.: 16/311,513

(22) PCT Filed: Jul. 28, 2016

(86) PCT No.: PCT/US2016/044567
§ 371 (c)(1),
(2) Date: Dec. 19, 2018

(87) PCT Pub. No.: WO2018/022070
PCT Pub. Date: Feb. 1, 2018

(65) Prior Publication Data
US 2020/0087571 A1    Mar. 19, 2020

(51) Int. Cl.
| | |
|---|---|
| *C09K 8/66* | (2006.01) |
| *C09K 8/68* | (2006.01) |
| *C09K 8/70* | (2006.01) |
| *C09K 8/80* | (2006.01) |
| *E21B 43/267* | (2006.01) |

(52) U.S. Cl.
CPC ............. *C09K 8/665* (2013.01); *C09K 8/685* (2013.01); *C09K 8/706* (2013.01); *C09K 8/80* (2013.01); *E21B 43/267* (2013.01); *C09K 2208/10* (2013.01); *C09K 2208/26* (2013.01); *C09K 2208/28* (2013.01)

(58) Field of Classification Search
CPC ........ C09K 8/665; C09K 8/685; C09K 8/706; C09K 8/80; C09K 2208/10; C09K 2208/26; C09K 2208/28; E21B 43/267
USPC ...................................................... 166/308.1
See application file for complete search history.

(56) References Cited

U.S. PATENT DOCUMENTS

| | | | |
|---|---|---|---|
| 5,373,901 A | 12/1994 | Norman et al. | |
| 5,604,186 A | 2/1997 | Hunt et al. | |
| 6,357,527 B1 | 3/2002 | Norman et al. | |
| 8,695,704 B2 * | 4/2014 | Muthusamy | C09K 8/685 166/283 |
| 2006/0046937 A1 | 3/2006 | Fu et al. | |

(Continued)

OTHER PUBLICATIONS

International Search Report and Written Opinion for PCT/US2016/044567 dated Apr. 27, 2017.

(Continued)

*Primary Examiner* — Matthew R Buck
*Assistant Examiner* — Patrick F Lambe
(74) *Attorney, Agent, or Firm* — Thomas Rooney; C. Tumey Law Group PLLC

(57) ABSTRACT

A variety of systems, methods and compositions are disclosed. A method may comprise introducing a fracturing fluid into a subterranean formation, wherein the fracturing fluid comprises an aqueous based fluid, a proppant composition, an oxidizing breaker, and halloysite nanotubes, wherein the oxidizing breaker is positioned within the halloysite nanotubes; and reducing a viscosity of the fracturing fluid.

20 Claims, 3 Drawing Sheets

(56) References Cited

U.S. PATENT DOCUMENTS

| | | | |
|---|---|---|---|
| 2006/0144592 A1* | 7/2006 | Hanes, Jr. | C09K 8/703 |
| | | | 166/279 |
| 2012/0015852 A1* | 1/2012 | Quintero | C09K 8/32 |
| | | | 507/112 |
| 2013/0345099 A1 | 12/2013 | Rana et al. | |
| 2016/0060503 A1 | 3/2016 | Chakraborty et al. | |
| 2018/0044576 A1* | 2/2018 | Pantsurkin | C09K 8/805 |

OTHER PUBLICATIONS

"Immobilization of enzyme biocatalyst on natural halloysite nanotubes" Zhai et al. Sep. 29, 2010.
"Halloysite Clay Nanotubes for Enzyme Immobilization" Tully et al. Dec. 23, 2015.

* cited by examiner

EXCAPSULATION OXIDIZING BREAKERS FOR DOWNHOLE APPLICATIONS

BACKGROUND

Fracturing treatments are commonly used in subterranean operations, among other purposes, to stimulate the production of desired fluids (e.g., oil, gas, water, etc.) from a subterranean formation. For example, hydraulic fracturing treatments generally involve pumping a treatment fluid (e.g., a fracturing fluid) into a well bore that penetrates a subterranean formation at a sufficient hydraulic pressure to create or enhance one or more fractures in the subterranean formation. The creation and/or enhancement of these fractures may enhance the production of fluids from the subterranean formation.

In order to maintain and/or enhance the conductivity of a fracture in a subterranean formation, proppant particulates may be deposited in the fracture, for example, by introducing a high viscosity fracturing fluid carrying those proppant particulates into the subterranean formation. The proppant particulates may prevent the fractures from fully closing upon the release of hydraulic pressure, forming conductive channels through which fluids may flow to the wellbore.

After the high viscosity fracturing fluid has been pumped into the formation and fracturing of the formation has occurred, it may be desirable to remove the fluid from the formation to allow hydrocarbon production through the new fractures. The removal of the highly viscous fracturing fluid may be accomplished by "breaking" the gel or emulsion or, in other words, by converting the fracturing fluid into a lower viscosity fluid, such that the fracturing fluid may be flowed back from the formation, for example.

BRIEF DESCRIPTION OF THE DRAWINGS

These drawings illustrate certain aspects of the present disclosure, and should not be used to limit or define the disclosure.

DETAILED DESCRIPTION

Figure 1:
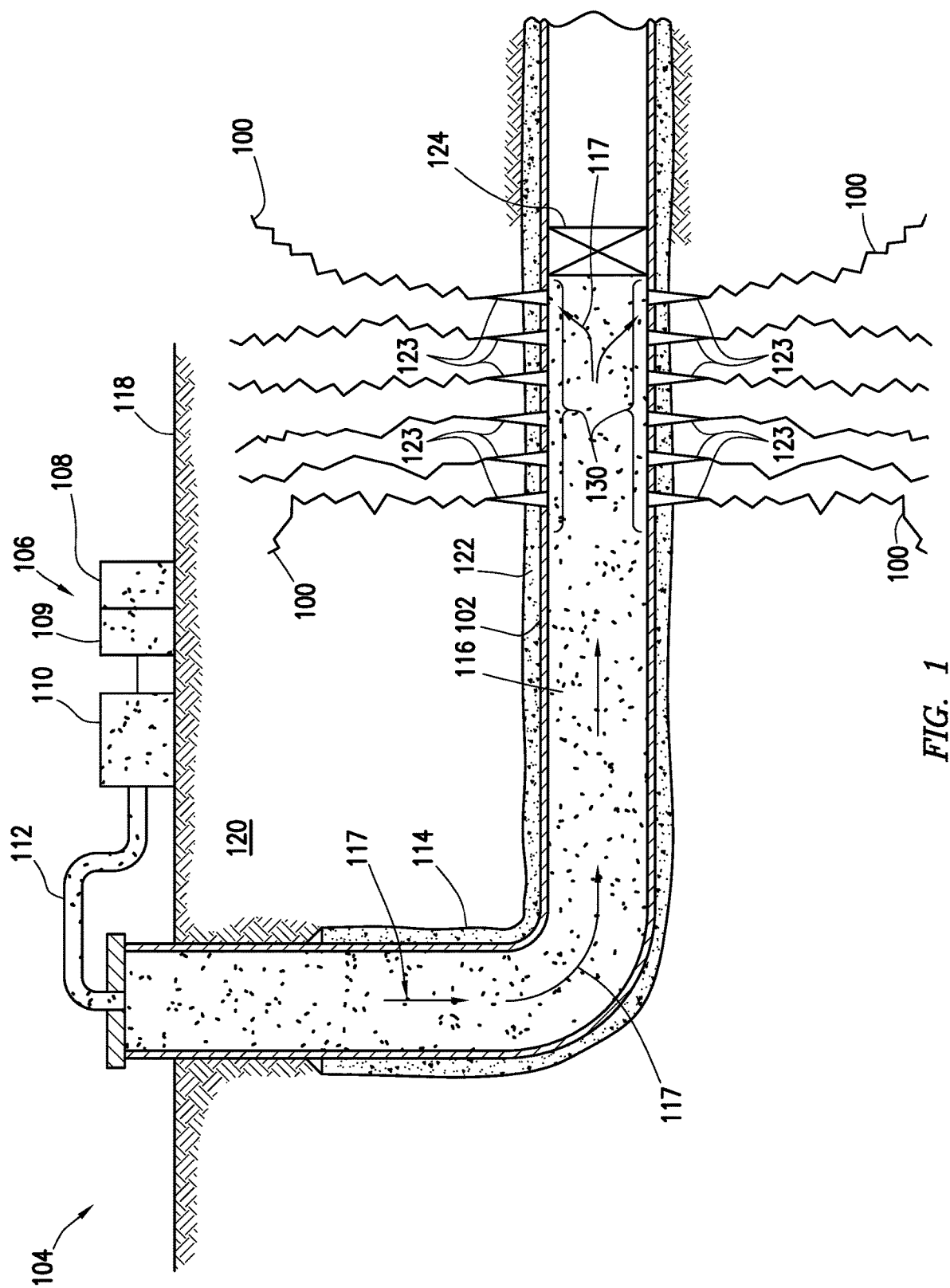
FIG. 1 is a schematic view of an example well system utilized for hydraulic fracturing.

The systems, methods, and/or compositions disclosed herein may relate to subterranean operations and, in some systems, methods, and compositions, to controllably break an aqueous based fracturing fluid utilized to stimulate a subterranean formation. The present disclosure is further directed to a fracturing fluid which may comprise, without limitation, an aqueous based fluid, proppant composition, an oxidizing breaker, and halloysite nanotubes. To controllably break the fracturing fluid, the oxidizing breaker may be positioned within the halloysite nanotubes. Optionally, the fracturing fluid may comprise additional additives for use in downhole applications, such as a gelling agent, a crosslinking agent (e.g., metal crosslinking agent), a scale control agent, a clay control agent, a bactericide, a surfactant, a pH adjusting agent, and a friction reducing polymer, among others. Additionally, an oxidizing breaker or metal catalyst for the oxidizer breaker may also be encapsulated to delay the release if extended stability of the fluid is desired.

Halloysite ($Al_2Si_2O_5(OH)_4 2H_2O$) a naturally occurring aluminosilicate nanotube, is a two-layered aluminosilicate, with a predominantly hollow tubular structure in the sub-micron range and chemically similar to kaolin. The adjacent alumina and silica layers may curve and form multilayer tubes due to a packing disorder. Halloysite is an economically viable material that can be mined as a raw mineral. The diameter for the halloysite nanotubes may be less than 1 nanometer ("nm"), for example, in a range from about 40 nm to about 200 nm. The length may be about 500 nm to about 1.2 microns. The halloysite nanotubes may be non-toxic and may be dispersed throughout the fracturing fluid. The specific surface area may be about 65 $m^2/g$; the pore volume may be about 1.25 mL/g; the refractive index may be about 1.54; and the specific gravity may be about 2.53 $g/cm^3$. The halloysite nanotubes may soak in a liquid oxidative breaker (e.g., xanthan) first, then this 'encapsulated breaker' may be added into a fracturing fluid at a concentration ranging from about 0.1 to about 2 gpt depending on temperature and pump time required. The concentration of the halloysite nanotubes may be about 0.1% to about 1% w/w. Other concentrations of the halloysite nanotubes may also be suitable. The halloysite nanotubes may include oxidizing breakers.

The fracturing fluid may be capable of providing a controlled release of oxidizing breakers in the fracturing fluids. The fracturing fluid may comprise oxidizing breakers such as, for example, peroxides, persulfates, chlorite, chlorate, bromate, perborate, oxyacids and oxyanions of halogens, chlorous acid, hypochlorous acid, hypochlorite, and/or perchlorate. Combinations of suitable oxidizing breakers also may be used. The oxidizing breakers may be used at a temperature range of about 120° F. to about 250° F. However, it is recognized that oxidizing breakers may be used outside these temperature ranging, for example, depending on a particular application. By way of example, chlorous acid (solid form) may be utilized at temperatures above about 250° F. and a liquid form of chlorous acid may be utilized at temperatures below about 250° F. The oxidizing breakers may be positioned within the hollow tubular structures of the halloysite nanotubes (encapsulation). The halloysite nanotubes may deliver the oxidizing breakers downhole, and then slowly release the active oxidizers within the oxidizing breakers over time to break the fracturing fluid. While encapsulation of the oxidizing breakers in the halloysite nanotubes may be useful in a variety of downhole applications, they may be particularly useful for high temperature fracturing applications, as encapsulation of the oxidizing breakers may extend their utility to higher temperatures. By positioning the oxidizing breakers inside the halloysite nanotubes, the oxidizing activity of the oxidizing breakers may be delayed during downhole pumping which may ensure the stability of the fluid from premature screening.

The oxidizing breakers may be positioned (encapsulated) inside the hollow tubular structures of the halloysite nanotubes using any suitable technique. Without limitation, suitable techniques may include mixing, pressure assistance and/or ultrasonication. Ultrasonication may be an effective technology for dispersing halloysite nanotubes in water, oil or polymers at low or high concentrations. The liquid jet streams resulting from ultrasonic cavitation may overcome the bonding forces between the halloysite nanotubes, and separate the halloysite nanotubes. Because of the ultrasonically generated shear forces and micro turbulences, ultrasonication can assist in the surface coating and chemical reaction of halloysite nanotubes with other materials, as well. A coarse halloysite nanotube-dispersion may be first premixed by a stirrer and then homogenized in an ultrasonic flow cell reactor. The oxidizing breakers may be included in the fracturing fluid in an amount in the range from about 0.1% to about 5% by weight of the aqueous based fluid in the fracturing fluid, and preferably in an amount ranging from about 0.1% to about 2% by weight of the aqueous based fluid in the fracturing fluid. As mentioned above, the fracturing fluid may include an aqueous based fluid.

An aqueous based fluid may include fresh water or salt water. The term "salt water" is used herein to mean unsaturated salt solutions and saturated salt solutions including brines and seawater. Generally, salt may be added to the water to provide clay stability and to increase the density of the aqueous based fluid. Examples of salts that can be used include, but are not limited to, sodium chloride, sodium bromide, calcium chloride, potassium chloride, ammonium chloride and mixtures thereof. Without limitation, the salt or salts used can be present in the salt water in a concentration up to about 66% by weight thereof and the salt water can have a density up to about 15.5 pounds per gallon. The amount of water in the fracturing fluid may be up to about 80% to about 99.9%, depending on the concentration of salt and additives.

In addition to the aqueous based fluid, the fracturing fluid may comprise a proppant composition. The proppant composition may include a variety of proppant particulates, including, but not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. Without limitation, the proppant particulates may comprise graded sand. Other suitable proppant particulates that may be suitable for use in subterranean applications may also be useful. Without limitation, the proppant particulates may have a particle size in a range from about 2 mesh to about 400 mesh, U.S. Sieve Series. By way of example, the proppant particulates may have a particle size of about 10 mesh to about 70 mesh with distribution ranges of 10-20 mesh, 20-40 mesh, 40-60 mesh, or 50-70 mesh, depending, for example, on the particle sizes of the formation particulates to be screen out. The proppant composition may be carried by the fracturing fluid. Without limitation, the proppant composition may be present in the fracturing fluid in a concentration of about 0.1 pounds per gallon to about 10 ppg, about 0.2 ppg to about 6 ppg. These ranges encompass every number in between, for example. For example, the concentration may range between about 0.5 ppg to about 4 ppg. One of ordinary skill in the art with the benefit of this disclosure should be able to select an appropriate amount of the proppant composition to use for a particular application.

The proppant composition may further comprise a curable resin, a tackifying agent, or both. Inclusion of the curable resin in the proppant composition may fill the fractures, providing an in-situ mechanical screen that can hold the proppant composition in place while maintaining integrity of the well. Curable resins suitable for use in the proppant composition may include any resin that is capable of forming a hardened, consolidated mass. Many such curable resins are commonly used in consolidation treatments, and some suitable curable resins may include, without limitation, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable curable resins, such as epoxy resins, may be cured with an internal catalyst or activator so that when pumped downhole, they may be cured using only time and temperature. Other suitable curable resins, such as furan resins may generally require a time-delayed catalyst or an external catalyst to help activate the polymerization of the resins if the cure temperature is low (i.e., less than about 250° F.) but may cure under the effect of time and temperature if the formation temperature is above about 250° F., preferably above about 300° F. The amount of curable resin may be from about 0.5% to about 5% v/v with respect to the proppant. Concentrations of the proppant in fracturing fluid may range from about 0.5 lb/gal to about 10 lb/gal.

Selection of a suitable curable resin may be affected by the temperature of the subterranean formation to which the proppant composition may be introduced. By way of example, for a subterranean formation having a bottom hole static temperature ("BHST") ranging from about 60° F. to about 250° F., two component epoxy based resins comprising a hardenable resin component and a hardening agent component may be preferred. For a subterranean formation having a BHST ranging from about 300° F. to about 600° F., a furan based resin may be preferred, for example. For a subterranean formation having a BHST ranging from about 200° F. to about 400° F., either a phenolic based resin or a one component HT epoxy based resin may be suitable, for example. For a subterranean formation having a BHST of at least about 175° F., a phenol/phenol formaldehyde/furfuryl alcohol resin may also be suitable, for example. With the benefit of this disclosure, one of ordinary skill in the art should be able to recognize and select a suitable resin for use in consolidation treatment applications.

As mentioned above, the proppant composition may comprise a tackifying agent. Tackifying agents may be utilized in hydraulic fracturing, wherein a formation may be treated to increase its permeability by hydraulically fracturing the formation to create or enhance one or more fractures. In many cases, hydraulic fracturing may involve pumping a particulate-free, viscous fluid (known as a pad fluid) into a subterranean formation faster than the fluid can escape into the formation so that the pressure applied to the formation increases, and the formation breaks, creating an artificial fracture or enlarging a natural fracture. Then a proppant particulate may be added to a fluid to form a slurry that is pumped into the fracture to prevent the fracture from closing when the pumping pressure is released. Often, the proppant particulate may be coated with a tackifying agent to enhance agglomeration and to prevent migration of the proppant particulates after they are placed in the fracture. The amount of tackifying agent within the fracturing fluid may range from about 0.5% to about 5% v/v with respect to the proppant.

Compositions suitable for use as tackifying agents in the present disclosure may comprise any compound that, when in liquid form or in a solvent solution, will form a tacky, non-hardening coating upon a particulate. Tackifying agents suitable for use in the present disclosure include non-aqueous tackifying agents; aqueous tackifying agents; silylmodified polyamides, and reaction products of an amine and a phosphate ester. In addition to encouraging particulates to form aggregates, the use of a tackifying agent may reduce particulate flow back once the particulates are placed into a subterranean formation. The tackifying agents are may be coated used in an amount ranging from about 0.1% to about 5% by weight of the proppant composition, for example, ranging from about 0.5% to about 2.5% by weight of the proppant composition. One type of tackifying agent suitable may be a non-aqueous tackifying agent. A specific example of a suitable tackifying agents may comprise polyamides that are liquids or in solution at the temperature of the subterranean formation such that they are, by themselves, non-hardening when introduced into the subterranean formation. An example of a tacking agent may comprise a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like.

Non-aqueous tackifying agents suitable for use in the present disclosure may be either used such that they form non-hardening coating or they may be combined with a multifunctional material capable of reacting with the non-aqueous tackifying agent to form a hardened coating. A "hardened coating" as used herein means that the reaction of the tackifying agent with the multifunctional material will result in a substantially non-flowable reaction product that exhibits a higher compressive strength in a consolidated agglomerate than the tackifying agent alone with the particulates. In this instance, the non-aqueous tackifying agent may function similarly to a curable resin. Multifunctional materials suitable for use may include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. Without limitation, the multifunctional material may be mixed with the tackifying agent in an amount of from about 0.01% to about 50% by weight of the tackifying agent to effect formation of the reaction product. Specifically, the multifunctional material is present in an amount of from about 0.5% to about 1% by weight of the tackifying agent.

Aqueous tackifying agents suitable for use in the present disclosure may not be significantly tacky when placed onto a particulate, but may be capable of being "activated" (that is destabilized, coalesced and/or reacted) to transform the compound into a sticky, tackifying compound at a desirable time. Such activation may occur before, during, or after the aqueous tackifying agent is placed in the subterranean formation. In some embodiments, a pretreatment may be first contacted with the surface of a particulate to prepare it to be coated with an aqueous tackifying agent. Suitable aqueous tackifying agents may be generally charged polymers that comprise compounds that, when in an aqueous solvent or solution, may form a non-hardening coating (by itself or with an activator) and, when placed on a particulate, may increase the continuous critical resuspension velocity of the particulate when contacted by a stream of water. The aqueous tackifying agent may enhance the grain-to-grain contact between the individual particulates within the formation (be they proppant particulates, formation fines, or other particulates), helping bring about the consolidation of the particulates into a cohesive, flexible, and permeable mass. Suitable aqueous tackifying agents include any polymer that can bind, coagulate, or flocculate a particulate. Also, polymers that function as pressure sensitive adhesives may be suitable. Examples of aqueous tackifying agents suitable for use in include, but are not limited to: acrylic acid polymers; acrylic acid ester polymers; acrylic acid derivative polymers; acrylic acid homopolymers; acrylic acid ester homopolymers (such as poly(methyl acrylate), poly (butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers, derivatives thereof, and combinations thereof. In addition to tackifying agents, the fracturing fluid may include gelling agents.

Gelling agents may be included in the fracturing fluid to increase the fracturing fluid's viscosity which may be desired for a number of reasons in subterranean applications. For example, an increase in viscosity may be used for transferring hydraulic pressure to divert treatment fluids to another part of a formation or for preventing undesired leak-off of fluids into a formation from the buildup of filter cakes. The increased viscosity of the gelled or gelled and cross-linked treatment fluid, among other things, may reduce fluid loss and may allow the fracturing fluid to transport significant quantities of suspended proppant particulates. Gelling agents may include, but are not limited to, any suitable crosslinkable polymer, including, but not limited to, galactomannan gums, cellulose derivatives, combinations thereof, derivatives thereof, and the like. Galactomannan gums are generally characterized as having a linear mannan backbone with various amounts of galactose units attached thereto. Examples of suitable galactomannan gums include, but are not limited to, gum arabic, gum ghatti, gum karaya, tamarind gum, tragacanth gum, guar gum, locust bean gum, combinations thereof, derivatives thereof, and the like. Other suitable gums include, but are not limited to, hydroxyethylguar, hydroxypropylguar, carboxymethylguar, carboxymethylhydroxyethylguar and carboxymethylhydroxypropylguar. Examples of suitable cellulose derivatives include hydroxyethyl cellulose, carboxyethylcellulose, carboxymethylcellulose, and carboxymethylhydroxyethylcellulose; derivatives thereof, and combinations thereof. The crosslinkable polymers included in the treatment fluids of the present disclosure may be naturally-occurring, synthetic, or a combination thereof. The crosslinkable polymers may comprise hydratable polymers that contain one or more functional groups such as hydroxyl, cis-hydroxyl, carboxyl, sulfate, sulfonate, phosphate, phosphonate, amino, or amide groups. In certain embodiments, the crosslinkable polymers may be at least partially crosslinked, wherein at least a portion of the molecules of the crosslinkable polymers are crosslinked by a reaction comprising a crosslinking agent. The amount of gelling agent within the fracturing fluid may range from about 5 lbs/1,000 gal to about 60 lbs/1,000 gal. Additionally, the amount of gelling agent may be up to 200 lbs/1,000 gal; however, if a low molecular weight material is used, the amount of gelling agent may exceed 200 lbs/1,000 gal.

Crosslinking agents may be generally included in the fracturing fluid of the present disclosure to crosslink at least a portion of the molecules of the crosslinkable polymers to form a crosslinked polymer. The term "crosslinking agent" is defined herein to include any molecule, atom, or ion that is capable of forming one or more crosslinks between molecules of the crosslinkable polymer and/or between one or more atoms in a single molecule of the crosslinkable polymer. The crosslinking agent in the fracturing fluid of the present disclosure may comprise a metal ion that is capable of crosslinking at least two molecules of the crosslinkable polymer. Examples of suitable crosslinking agents include, but are not limited to, borate ions, zirconium ions, titanium ions, aluminum ions, antimony ions, chromium ions, iron ions, copper ions, and zinc ions. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconium lactate, zirconium lactate triethanolamine, zirconium carbonate, zirconium acetylacetonate, zirconium malate, zirconium citrate, zirconium diisopropylamine lactate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof. The amount of crosslinking agent(s) may range from about 0.1 gal/1,000 gal to about 10 gal/1,000 gal, depending on the crosslinker(s) and its/their concentration(s).

Additionally, the crosslinking agent may comprise a delayed crosslinking agent, which may be formulated to form crosslinks between polymer molecules after a certain time or under certain conditions (e.g., temperature, pH). The fracturing fluid may comprise a crosslinking delaying agent, such as a polysaccharide crosslinking delaying agents derived from guar, guar derivatives, or cellulose derivatives. The crosslinking delaying agent may be included in the fracturing fluid to delay crosslinking of the crosslinkable polymers until desired. One of ordinary skill in the art, with the benefit of this disclosure, will know the appropriate amount of the crosslinking delaying agent to include in the treatment fluids for a desired application.

Suitable crosslinking agents may be present in the fracturing fluid of the present disclosure in an amount sufficient to provide the desired degree of crosslinking between molecules of the crosslinkable polymers. The crosslinking agent may be present in the fracturing fluid in an amount in the range from about 10 parts per million ("ppm") to about 500 ppm by weight of the fracturing fluid. The crosslinking agent may be present in the fracturing fluid in an amount in the range from about 75 ppm to about 200 ppm by weight of the fracturing fluid. One of ordinary skill in the art, with the benefit of this disclosure, will recognize the appropriate type and amount of crosslinking agent to include in a treatment fluid based on, among other things, the temperature conditions of a particular application, the type of crosslinkable polymers used, the molecular weight of the crosslinkable polymers, and/or the pH of the fracturing fluid. In addition to crosslinking agents, the fracturing fluid may include scale controlling agents.

Optionally, the fracturing fluid may include scale control agents. Scale control agents may include, but are not limited to, carboxylated polymers, organophosphates, organophosphonates and polyphosphonates. The carboxylated polymers may include polymers and copolymers of acrylic or methacrylic acids, commonly referred to as polyacrylic acids. Organophosphorous-containing inhibitors include alkyl ethoxylated phosphates; ethylenediaminetetramethylene phosphonic acid; aminotrimethylene phosphonic acid; hexamethylenediaminetetramethylene phosphonic acid; diethylenetriamine-pentamethylene phosphonic acid; hydroxyethylidenediphosphonic acid and polyvinyl phosphonic acid. Exemplary scale forming compounds which can be inhibited with the use of the scale control agents may include $BaSO_4$, $SrSO_4$, $SrCO_3$, $CaCO_3$, $Mg(OH)_2$, $CaSO_4$, $CaF_2$, ZnS, FeS, PbS, NaCl, calcium phosphate, silicate, and silica scale. Suitable amounts of scale control agents may be included in the fracturing fluid of the present disclosure in a range from about 0.2 to about 0.3 gallons per about 1,000 gallons of the fracturing fluid. The scale control agents can be used in brines having a pH value ranging from about 5.0 to about 9.0, inclusive, wherein at pH ranges outside of this range, the effectiveness of the scale control agents decreases. However, the scale control agents that can be used in accordance with aspects of the fracturing fluid of the present disclosure includes scale control agents that can be used at pH values outside of the described pH range mentioned above.

In addition to scale control agents, the fracturing fluid may optionally include clay control agents. Clay control agents may include, but are not limited to, potassium chloride, sodium chloride, ammonium chloride, and/or tetramethyl ammonium chloride. When used, the clay control agents may be included in the fracturing fluid in an amount in the range from about 0.1% to about 20% by weight of the aqueous base fluid therein and alternatively from about 0.5% to about 10% by weight of the aqueous base fluid in the fracturing fluid.

Optionally, the fracturing fluid may also include bactericides. Bactericides may be included in the fracturing fluid to protect both the subterranean formation as well as the fracturing fluid from attack by bacteria. Such attacks may be problematic because they may lower the viscosity of the fracturing fluid, resulting in poor performance, such as inadequate sand suspension properties, for example. Bactericides suitable for use with the fracturing fluid may include, but are not limited to, aldehydes such as glutaraldehyde and glutaric aldehyde; nitro-group (NC>2)-containing compounds such as 2,2-dibromo-3-nitrilopropionamide, 2-bromo-2-nitro-1,3-propanediol, triazines, such as hexahydro-1,3,6-tris(hydroxyethyl)-S-triazine, hexahydro-1,3,5-triethyl-s-triazine; sulfur-containing heterocycles, such as 3,5-dimethyl-1,3,5-thiadiazinane-2-thione (also commonly referred to as "Thione"), sulfates, such as tetrakis-hydroxymethyl phosphonium sulfate; solutions of 5-chloro-2-methyl-4-isothiazolin-3-one and 2-methyl-4-isothiazolin-3-one; alkyl-aryl triethylammonium chloride solution; methylene bis(thiocyanate); 2-methyl-5-nitroimidazole-1-ethanol; as well as combinations of any of the foregoing bactericides. Additional examples of suitable bactericides may include sodium hypochlorite/sodium hydroxide admixtures, lithium and calcium hypochlorite and hydrogen peroxide. The bactericides may be present in the fracturing fluid in an amount in the range from about 0.001% to about 1.0% by weight of the fracturing fluid. The bactericides may be added to the fracturing fluid before the gelling agent is added.

In addition to bactericides, the fracturing fluid may optionally include surfactants. Surfactants used in the fracturing fluid may include, but are not limited to, a cationic surfactant, an anionic surfactant, a zwitterionic surfactant and/or a non-ionic surfactant. The surfactants may include amphiphilic molecules comprising a hydrophobic tail group and a hydrophilic head group. The hydrophilic head can be charged. A cationic surfactant may include a positively-charged head. An anionic surfactant may include a negatively-charged head. A zwitterionic surfactant may include both a positively and negatively charged head. A surfactant with no charge is called a non-ionic surfactant. Other surfactants types for use in the fracturing fluid may include amphoteric, silicon, fluorinated, and/or polymeric surfactants. The amount of surfactant may range from about 0.1 gpt (gal/1,000 gal) to about 10 gpt.

In addition to surfactants, the fracturing fluid may optionally include pH adjusting agents. pH adjusting agents may include, but are not limited to, citric acid, succinic acid, phosphoric acid, sodium hydroxide, and/or sodium carbonate. The pH of the aqueous based fluid may be adjusted (e.g., by a buffer or other pH adjusting agent), among other purposes, to activate a crosslinking agent, and/or to reduce the viscosity of the fracturing fluid (e.g., activate an oxidizing breaker, deactivate a crosslinking agent). The pH may be adjusted to a specific level, which may depend on, among other factors, the types of crosslinking agents, and/or oxidizing breakers included in the fracturing fluid. One of ordinary skill in the art, with the benefit of this disclosure, will recognize when such density and/or pH adjustments are appropriate. Depending on the type of fracturing fluid, pH may range from about low 3 to about high 11.

Further, without limitation, the fracturing fluid may comprise a friction reducing polymer. The friction reducing polymer may be included in the fracturing fluid to form a slickwater fluid, for example. The friction reducing polymer may be a synthetic polymer. Additionally, for example, the friction reducing polymer may be an anionic polymer or a cationic polymer. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof. The friction reducing polymer may also include polyacrylamide, polyacrylate, or other suitable polymer. Without limitation, the friction reducing polymer may be included in the fracturing fluid to provide a desired amount of friction reducing. For example, the friction reducing polymer may be included in the fracturing fluid, for example, in an amount equal to or less than 0.2% by weight of the aqueous based fluid present in the fracturing fluid. Without limitation, the friction reducing polymer may be included in the fracturing fluid in an amount sufficient to reduce friction without gel formation upon mixing.

Additionally the fracturing fluid may comprise any number of additional additives, including, but not limited to, salts, acids, fluid loss control additives, gas, foamers, corrosion inhibitors, catalysts, friction reducers, antifoam agents, bridging agents, dispersants, flocculants, $H_2S$ scavengers, $CO_2$ scavengers, oxygen scavengers, lubricants, weighting agents and any combination thereof. With the benefit of this disclosure, one of ordinary skill in the art should be able to recognize and select suitable additives for use in the fracturing fluid.

Accordingly, this disclosure describes compositions, methods and systems that may be used for fracturing a subterranean formation. A fracturing fluid may comprise an aqueous based fluid; a proppant composition; an oxidizing breaker; and halloysite nanotubes, wherein the oxidizing breaker is positioned within the halloysite nanotubes. The fracturing fluid may contain any of the following features in any combination. The proppant composition may comprise a curable resin, a tackifying agent, or combinations thereof. The curable resin may comprise at least one resin selected from the group consisting of an epoxy resin, a two component epoxy based resins, novolak resins, polyepoxide resins, phenol-aldehyde resins, urea-aldehyde resins, urethane resins, phenolic resins, furan resins, furan alcohol resins, furfuryl alcohol resins, phenolic/latex resins, phenol formaldehyde resins, polyester resins and hybrids and copolymers thereof, polyurethane resins and hybrids and copolymers thereof, acrylate resins, and combinations thereof. The oxidizing breaker may comprise at least one oxidizing breaker selected from the group consisting of peroxides, persulfates, chlorite, chlorate, bromate, perborate, oxyacids and oxyanions of halogens, chlorous acid, hypochlorous acid, hypochlorite, perchlorate, and combinations thereof. The fracturing fluid may further comprise a friction reducing polymer, a gelling agent, a crosslinking agent or combinations thereof. The friction reducing polymer may comprise acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, polyacrylamide, polyacrylate, or combinations thereof. Diameters of the halloysite nanotubes may range from about 40 nanometers to about 200 nanometers. The lengths of the halloysite nanotubes may range from about 500 nanometers to about 1.2 microns. A concentration of halloysite nanotubes in the fracturing fluid may be about 0.1% to about 1% by weight of the aqueous based fluid. A concentration of the oxidizing breaker in the fracturing fluid may be about 0.1% to about 5% by weight of the aqueous based fluid.

A method may comprise introducing a fracturing fluid into a subterranean formation, wherein the fracturing fluid comprises an aqueous based fluid, a proppant composition, an oxidizing breaker, and halloysite nanotubes, wherein the oxidizing breaker is positioned within the halloysite nanotubes; and reducing a viscosity of the fracturing fluid. The method may contain any of the following features in any combination. The method may further comprise producing the fracturing fluid from the subterranean formation. The method may further comprise delaying oxidizing activity of the oxidizing breakers with the halloysite nanotubes. The oxidizing breakers may be positioned within the halloysite nanotubes with pressure assistance or ultrasonication. A temperature of the subterranean formation may be above about 250° F. The method may further comprise introducing a pad fluid into a subterranean formation at an injection rate above a fracture gradient to create or enhance at least one fracture in the subterranean formation. The oxidizing breaker may comprise at least one oxidizing breaker selected from the group consisting of peroxides, persulfates, chlorite, chlorate, bromate, perborate, oxyacids and oxyanions of halogens, chlorous acid, hypochlorous acid, hypochlorite, perchlorate, and combinations thereof. The diameters of the halloysite nanotubes may range from about 40 nanometers to about 200 nanometers. The proppant composition may comprise a curable resin, a tackifying agent, or combinations thereof. The curable resin may comprise at least one resin selected from the group consisting of an epoxy resin, a two component epoxy based resins, novolak resins, polyepoxide resins, phenol-aldehyde resins, urea-aldehyde resins, urethane resins, phenolic resins, furan resins, furan alcohol resins, furfuryl alcohol resins, phenolic/latex resins, phenol formaldehyde resins, polyester resins and hybrids and copolymers thereof, polyurethane resins and hybrids and copolymers thereof, acrylate resins, and combinations thereof. The fracturing fluid may further comprise a friction reducing polymer, a gelling agent, a crosslinking agent or combinations thereof. The friction reducing polymer may comprise acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, polyacrylamide, polyacrylate, or combinations thereof. The lengths of the halloysite nanotubes may range from about 500 nanometers to about 1.2 microns. A concentration of halloysite nanotubes in the fracturing fluid may be about 0.1% to about 1% by weight of the aqueous based fluid. A concentration of the oxidizing breaker in the fracturing fluid may be about 0.1% to about 5% by weight of the aqueous based fluid.

A system may comprise a fracturing fluid comprising an aqueous based fluid, a proppant composition, an oxidizing breaker, and halloysite nanotubes, wherein the oxidizing breaker is positioned within the halloysite nanotubes; and pumping equipment capable of pumping the fracturing fluid down a wellbore. The system may contain any of the following features in any combination. The diameters of the halloysite nanotubes may range from about 40 nanometers to about 200 nanometers. The oxidizing breaker may be positioned within the halloysite nanotubes with pressure assistance or ultrasonication. A temperature of the subterranean formation may be above about 250° F. The proppant composition may comprise a curable resin, a tackifying agent, or combinations thereof. The curable resin may comprise at least one resin selected from the group consisting of an epoxy resin, a two component epoxy based resins, novolak resins, polyepoxide resins, phenol-aldehyde resins, urea-aldehyde resins, urethane resins, phenolic resins, furan resins, furan alcohol resins, furfuryl alcohol resins, phenolic/latex resins, phenol formaldehyde resins, polyester resins and hybrids and copolymers thereof, polyurethane resins and hybrids and copolymers thereof, acrylate resins, and combinations thereof. The oxidizing breaker may comprise at least one oxidizing breaker selected from the group consisting of peroxides, persulfates, chlorite, chlorate, bromate, perborate, oxyacids and oxyanions of halogens, chlorous acid, hypochlorous acid, hypochlorite, perchlorate, and combinations thereof. The fracturing fluid may further comprise a friction reducing polymer, a gelling agent, a crosslinking agent or combinations thereof. The friction reducing polymer may comprise acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, polyacrylamide, polyacrylate, or combinations thereof. The lengths of the halloysite nanotubes may range from about 500 nanometers to about 1.2 microns. A concentration of halloysite nanotubes in the fracturing fluid may be about 0.1% to about 1% by weight of the aqueous based fluid. A concentration of the oxidizing breaker in the fracturing fluid may be about 0.1% to about 5% by weight of the aqueous based fluid.

FIG. 1 illustrates an example well system 104 that may be used to introduce halloysite nanotubes 116 into fractures 100. As mentioned above, the halloysite nanotubes 116 may include oxidizing breakers. The well system 104 may include a fluid handling system 106, which may include fluid supply 108, mixing equipment 109, pumping equipment 110, and wellbore supply conduit 112. Pumping equipment 110 may be fluidly coupled with the fluid supply 108 and wellbore supply conduit 112 to communicate a fracturing fluid 117, which may comprise proppant particulates and/or halloysite nanotubes 116 into wellbore 114. The fluid supply 108 and pumping equipment 110 may be above the surface 118 while the wellbore 114 is below the surface 118.

The well system 104 may also be used for the injection of a pad or pre-pad fluid into the subterranean formation at an injection rate above the fracture gradient to create at least one fracture 100 in subterranean formation 120. The well system 104 may then inject the fracturing fluid 117 into subterranean formation 120 surrounding the wellbore 114. Generally, a wellbore 114 may include horizontal, vertical, slanted, curved, and other types of wellbore geometries and orientations, and the proppant particulates and halloysite nanotubes 116 may generally be applied to subterranean formation 120 surrounding any portion of wellbore 114, including fractures 100. The wellbore 114 may include the casing 102 that may be cemented (or otherwise secured) to the wall wellbore 114 by cement sheath 122. Perforations 123 may allow communication between the wellbore 114 and the subterranean formation 120. As illustrated, perforations 123 may penetrate casing 102 and cement sheath 122 allowing communication between interior of casing 102 and fractures 100. A plug 124, which may be any type of plug for oilfield applications (e.g., bridge plug), may be disposed in wellbore 114 below the perforations 123.

In accordance with systems, methods, and/or compositions of the present disclosure, a perforated interval of interest 130 (depth interval of wellbore 114 including perforations 123) may be isolated with plug 124. A pad or pre-pad fluid may be injected into the subterranean formation 120 at an injection rate above the fracture gradient to create at least one fracture 100 in subterranean formation 120. Then, halloysite nanotubes 116 may be mixed with an aqueous based fluid and optionally proppant particulates via mixing equipment 109, thereby forming a fracturing fluid 117, and then may be pumped via pumping equipment 110 from fluid supply 108 down the interior of casing 102 and into subsurface formation 120 at or above a fracture gradient of the subterranean formation 120. Pumping the fracturing fluid 117 at or above the fracture gradient of the subsurface formation 120 may create (or enhance) at least one fracture (e.g., fractures 101) extending from the perforations 123 into the subsurface formation 120. Alternatively, the fracturing fluid 117 may be pumped down production tubing, coiled tubing, or a combination of coiled tubing and annulus between the coiled tubing and the casing 102.

Figure 2:
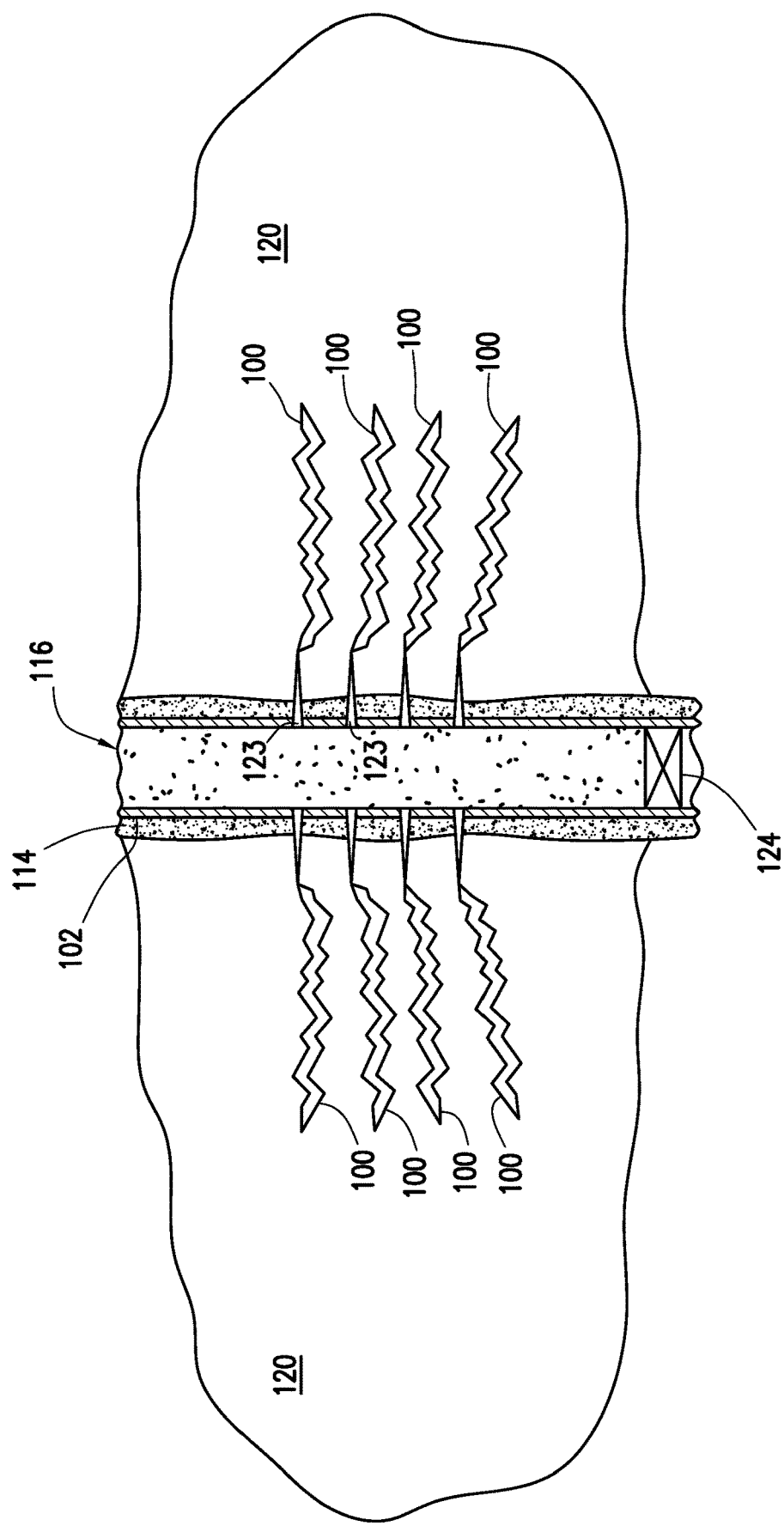
FIG. 2 is a schematic view of an example of a wellbore after introduction of halloysite nanotubes.

At least a portion of the fracturing fluid 117 may enter the fractures 100 of subterranean formation 120 surrounding wellbore 114 by way of perforations 123. Perforations 123 may extend from the interior of casing 102, through cement sheath 122, and into formation 120. The oxidizing breakers within the halloysite nanotubes 116 may break the fracturing fluid 117 (reduce viscosity of the fracturing fluid 117) due to the oxidative breaking mechanism of the oxidative breakers. Because the oxidative breakers are located within the halloysite nanotubes 116, contact of the oxidative breakers with the fracturing fluid 117 may be delayed, thereby delaying the oxidative breaking mechanism. After breaking, the fracturing fluid 117 may be produced from the wellbore 114. Referring to FIG. 2, the wellbore 114 is shown after placement of the halloysite nanotubes 116 in accordance with systems, methods, and compositions of the present disclosure.

The pumping equipment 110 may include a high pressure pump. As used herein, the term "high pressure pump" refers to a pump that is capable of delivering the fracturing fluid 117 and/or pad/pre-pad fluid downhole at a pressure of about 1000 psi or greater. A high pressure pump may be used when it is desired to introduce the fracturing fluid 117 and/or pad/pre-pad fluid into subterranean formation 120 at or above a fracture gradient of the subterranean formation 120, but it may also be used in cases where fracturing is not desired. Additionally, the high pressure pump may be capable of fluidly conveying particulate matter, such as the halloysite nanotubes 116, into the subterranean formation 120. Suitable high pressure pumps may include, but are not limited to, floating piston pumps and positive displacement pumps. Without limitation, the initial pumping rates of the pad fluid, pre-pad fluid and/or fracturing fluid 117 may range from about 15 bbl/min to about 80 bbl/min, enough to effectively create a fracture into the formation and place the halloysite nanotubes 116 into at least one fracture 101.

Alternatively, the pumping equipment 110 may include a low pressure pump. As used herein, the term "low pressure pump" refers to a pump that operates at a pressure of about 1000 psi or less. A low pressure pump may be fluidly coupled to a high pressure pump that may be fluidly coupled to a tubular (e.g., wellbore supply conduit 112). The low pressure pump may be configured to convey the fracturing fluid 117 and/or pad/pre-pad fluid to the high pressure pump. The low pressure pump may "step up" the pressure of the fracturing fluid 117 and/or pad/pre-pad fluid before it reaches the high pressure pump.

Mixing equipment 109 may include a mixing tank that is upstream of the pumping equipment 110 and in which the fracturing fluid 117 may be formulated. The pumping equipment 110 (e.g., a low pressure pump, a high pressure pump, or a combination thereof) may convey fracturing fluid 117 from the mixing equipment 109 or other source of the fracturing fluid 117 to the casing 102. Alternatively, the fracturing fluid 117 may be formulated offsite and transported to a worksite, in which case the fracturing fluid 117 may be introduced to the casing 102 via the pumping equipment 110 directly from its shipping container (e.g., a truck, a railcar, a barge, or the like) or from a transport pipeline. In either case, the fracturing fluid 117 may be drawn into the pumping equipment 110, elevated to an appropriate pressure, and then introduced into the casing 102 for delivery downhole.

The exemplary fracturing fluid disclosed herein may directly or indirectly affect one or more components or pieces of equipment associated with the preparation, delivery, recapture, recycling, reuse, and/or disposal of the fracturing fluid. For example, the fracturing fluid may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the sealant composition. The fracturing fluid may also directly or indirectly affect any transport or delivery equipment used to convey the fracturing fluid to a well site or downhole such as, for example, any transport vessels, conduits, pipelines, trucks, tubulars, and/or pipes used to compositionally move the fracturing fluid from one location to another, any pumps, compressors, or motors (e.g., topside or downhole) used to drive the fracturing fluid into motion, any valves or related joints used to regulate the pressure or flow rate of the fracturing fluid, and any sensors (i.e., pressure and temperature), gauges, and/or combinations thereof, and the like. The disclosed fracturing fluid may also directly or indirectly affect the various downhole equipment and tools that may come into contact with the fracturing fluid such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present disclosure, the following examples of certain aspects of some of the systems and methods are given. In no way should the following examples be read to limit, or define, the entire scope of the disclosure.

Examples

Figure 3:
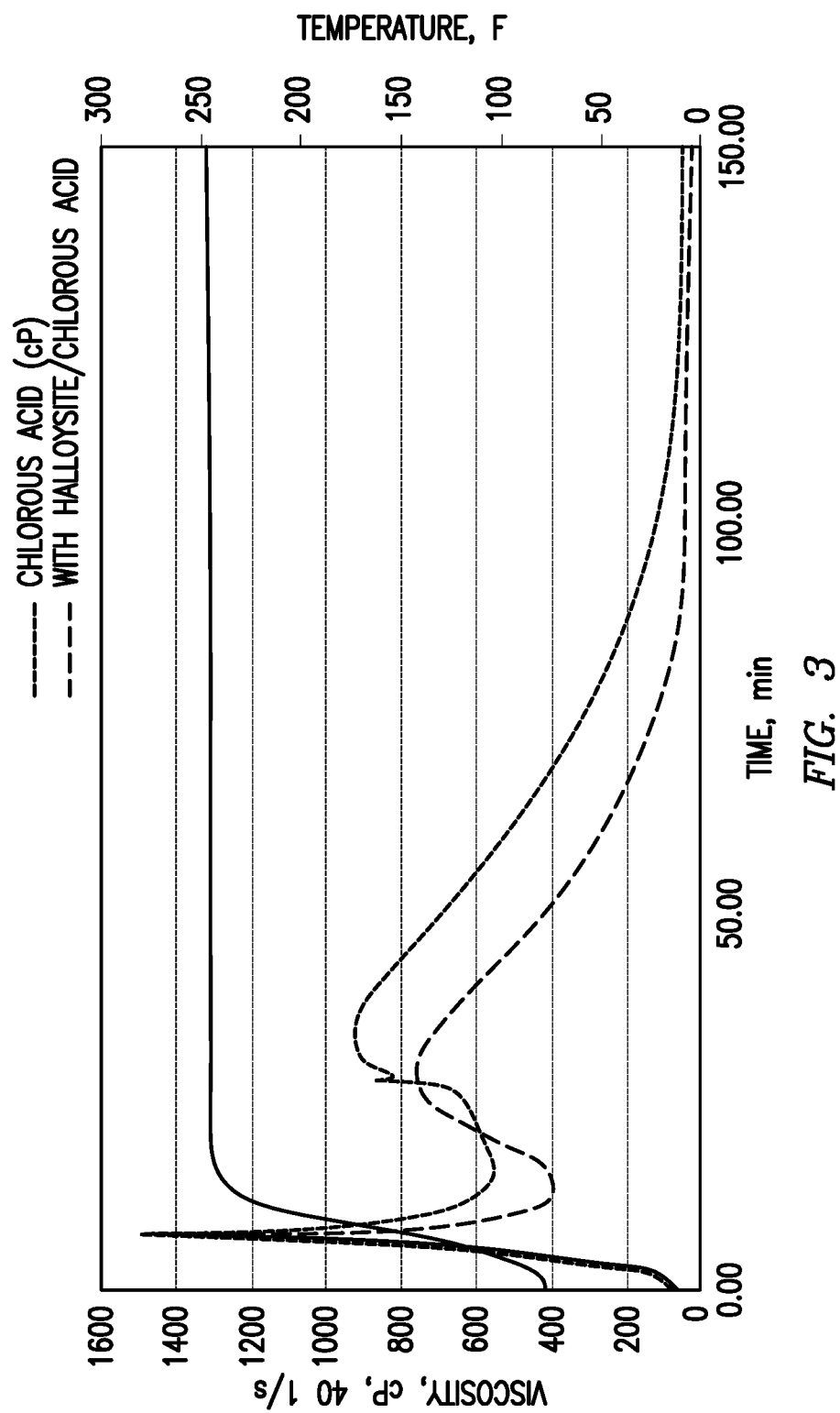
FIG. 3 illustrates a graph of viscosity vs. time of a fracturing fluid with the halloysite nanotubes.

In a demonstrative experiment, a gelled fluid was evaluated at 250° F., using a chlorous acid breaker (liquid) and a chlorous acid breaker encapsulated in halloysite nanotubes. The fluid formulations are: 25 lb/Mgal of a carboxymethylhydroxypropyl guar (CMHPG) (gelling agent), a carbonate-based pH adjusting agent (pH 10.5), 2 gallons per thousand gallons ("gpt") of an oxidizing breaker (chlorite breaker versus chlorite breaker disposed in halloysite nanotubes), 0.4 gpt of a zirconium-based crosslinking agent, 0.1 gpt another zirconium-based crosslinking agent. FIG. 3 illustrates the results of the experiment via a graph of viscosity vs. time of a fracturing fluid with the halloysite nanotubes. By use of the halloysite nanotubes, breaking activity was delayed by approximately 30 minutes at 250° F.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method comprising:
providing halloysite nanotubes with an oxidizing breaker positioned within the halloysite nanotubes to encapsulate the oxidizing breaker within the halloysite nanotubes; wherein ultrasonication is used to assist in the encapsulation of the oxidizing breaker within the halloysite nanotubes;
introducing a fracturing fluid into a subterranean formation, wherein the fracturing fluid comprises an aqueous based fluid, a proppant composition, the halloysite nanotubes, and the oxidizing breaker positioned within the halloysite nanotubes, wherein the proppant composition comprises from about 0.5% to about 5% by weight of the proppant composition of a pressure-sensitive tackifying agent, wherein the concentration of halloysite nanotubes in the fracturing fluid is about 0.1% to about 1% by weight of the aqueous base fluid, wherein the oxidizing breaker is present in an amount of about 0.1% to about 5% by weight of the aqueous based fluid, and wherein the oxidizing breaker comprises chlorous acid;
activating the pressure-sensitive tackifying agent downhole agglomerating proppant and formation fines;
delaying oxidizing activity of the oxidizing breakers with the halloysite nanotubes by up to 30 minutes;
releasing the oxidizing breaker encapsulated within the halloysite nanotubes; and
reducing a viscosity of the fracturing fluid due to contact of the released oxidizing breaker with the fracturing fluid to break the fracturing fluid resulting in viscosity reduction.

2. The method of claim 1, further comprising producing the fracturing fluid from the subterranean formation.

3. The method of claim 1, further comprising introducing a pad fluid into a subterranean formation at an injection rate above a fracture gradient to create or enhance at least one fracture in the subterranean formation.

4. The method of claim 1, wherein the oxidizing breaker further comprises at least one oxidizing breaker selected from the group consisting of peroxides, persulfates, chlorite, chlorate, bromate, perborate, oxyacids and oxyanions of halogens, hypochlorous acid, hypochlorite, perchlorate, and combinations thereof.

5. The method of claim 1, wherein diameters of the halloysite nanotubes range from about 40 nanometers to about 200 nanometers.

6. The method of claim 1, wherein lengths of the halloysite nanotubes range from about 500 nanometers to about 1.2 microns.

7. The method of claim 1, wherein the fracturing fluid further comprises a friction reducing polymer, a gelling agent, a crosslinking agent or combinations thereof.

8. A fracturing fluid comprising:
an aqueous based fluid;
a proppant composition; wherein the proppant composition comprises from about 0.5% to about 5% by weight of the proppant composition of a pressure-sensitive tackifying agent;
an oxidizing breaker; and
halloysite nanotubes, wherein the oxidizing breaker is positioned within the halloysite nanotubes to encapsulate the oxidizing breaker within the halloysite nanotubes, wherein the concentration of halloysite nanotubes in the fracturing fluid is about 0.1% to about 1% by weight of the aqueous base fluid, wherein the oxidizing breaker is present in an amount of about 0.1% to about 5% by weight of the aqueous based fluid, wherein the oxidizing breaker is positioned within the halloysite nanotubes with pressure assistance or ultrasonication, wherein the oxidizing breaker comprises chlorous acid.

9. The fracturing fluid of claim 8, wherein the proppant composition comprises a curable resin, a tackifying agent, or combinations thereof.

10. The fracturing fluid of claim 9, wherein the curable resin comprises at least one resin selected from the group consisting of an epoxy resin, a two component epoxy based resins, novolak resins, polyepoxide resins, phenol-aldehyde resins, urea-aldehyde resins, urethane resins, phenolic resins, furan resins, furan alcohol resins, furfuryl alcohol resins, phenolic/latex resins, phenol formaldehyde resins, polyester resins and hybrids and copolymers thereof, polyurethane resins and hybrids and copolymers thereof, acrylate resins, and combinations thereof.

11. The fracturing fluid of claim 8, wherein the oxidizing breaker further comprises at least one oxidizing breaker selected from the group consisting of peroxides, persulfates, chlorite, chlorate, bromate, perborate, oxyacids and oxyanions of halogens, hypochlorous acid, hypochlorite, perchlorate, and combinations thereof.

12. The fracturing fluid of claim 8, further comprising a friction reducing polymer, a gelling agent, a crosslinking agent or combinations thereof.

13. The fracturing fluid of claim 12, wherein the friction reducing polymer comprises acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters, polyacrylamide, polyacrylate, or combinations thereof.

14. The fracturing fluid of claim 8, wherein diameters of the halloysite nanotubes range from about 40 nanometers to about 200 nanometers.

15. The fracturing fluid of claim 8, wherein lengths of the halloysite nanotubes range from about 500 nanometers to about 1.2 microns.

16. A system comprising:
a fracturing fluid comprising an aqueous based fluid, a proppant composition, an oxidizing breaker, and halloysite nanotubes, wherein the proppant composition comprises from about 0.5% to about 5% by weight of the proppant composition of a pressure-sensitive tackifying agent, wherein the oxidizing breaker is positioned within the halloysite nanotubes to encapsulate the oxidizing breaker within the halloysite nanotubes, wherein the oxidizing breaker is present in an amount of about 0.1% to about 5% by weight of the aqueous based fluid, wherein the oxidizing breaker comprises chlorous acid, wherein the concentration of halloysite nanotubes in the fracturing fluid is about 0.1% to about 1% by weight of the aqueous base fluid, and wherein oxidizing activity of the oxidizing breaker is delayed by up to 30 minutes; and
pumping equipment capable of pumping the fracturing fluid down a wellbore, wherein the oxidizing breakers are positioned within the halloysite nanotubes with pressure assistance or ultrasonication.

17. The system of claim 16, wherein diameters of the halloysite nanotubes range from about 40 nanometers to about 200 nanometers.

18. The system of claim 16, wherein lengths of the halloysite nanotubes range from about 500 nanometers to about 1.2 microns.

19. The system of claim 16, wherein the oxidizing breaker further comprises at least one oxidizing breaker selected from the group consisting of peroxides, persulfates, chlorite, chlorate, bromate, perborate, oxyacids and oxyanions of halogens, hypochlorous acid, hypochlorite, perchlorate, and combinations thereof.

20. A method comprising:
providing halloysite nanotubes with an oxidizing breaker positioned within the halloysite nanotubes to encapsulate the oxidizing breaker within the halloysite nanotubes;
adding the halloysite nanotubes into a fracturing fluid;
introducing a fracturing fluid into a subterranean formation, wherein the fracturing fluid comprises an aqueous based fluid, a proppant composition, the halloysite nanotubes, and the oxidizing breaker positioned within the halloysite nanotubes, wherein the concentration of halloysite nanotubes in the fracturing fluid is about 0.1% to about 1% by weight of the aqueous base fluid, wherein the oxidizing breaker is present in an amount of about 0.1% to about 5% by weight of the aqueous based fluid;
delaying oxidizing activity of the oxidizing breakers with the halloysite nanotubes by up to 30 minutes;
releasing the oxidizing breaker encapsulated within the halloysite nanotubes; and
reducing a viscosity of the fracturing fluid due to contact of the released oxidizing breaker with the fracturing fluid to break the fracturing fluid resulting in viscosity reduction, wherein the oxidizing breakers are positioned within the halloysite nanotubes with pressure assistance or ultrasonication.

\* \* \* \* \*